Patented Dec. 20, 1938

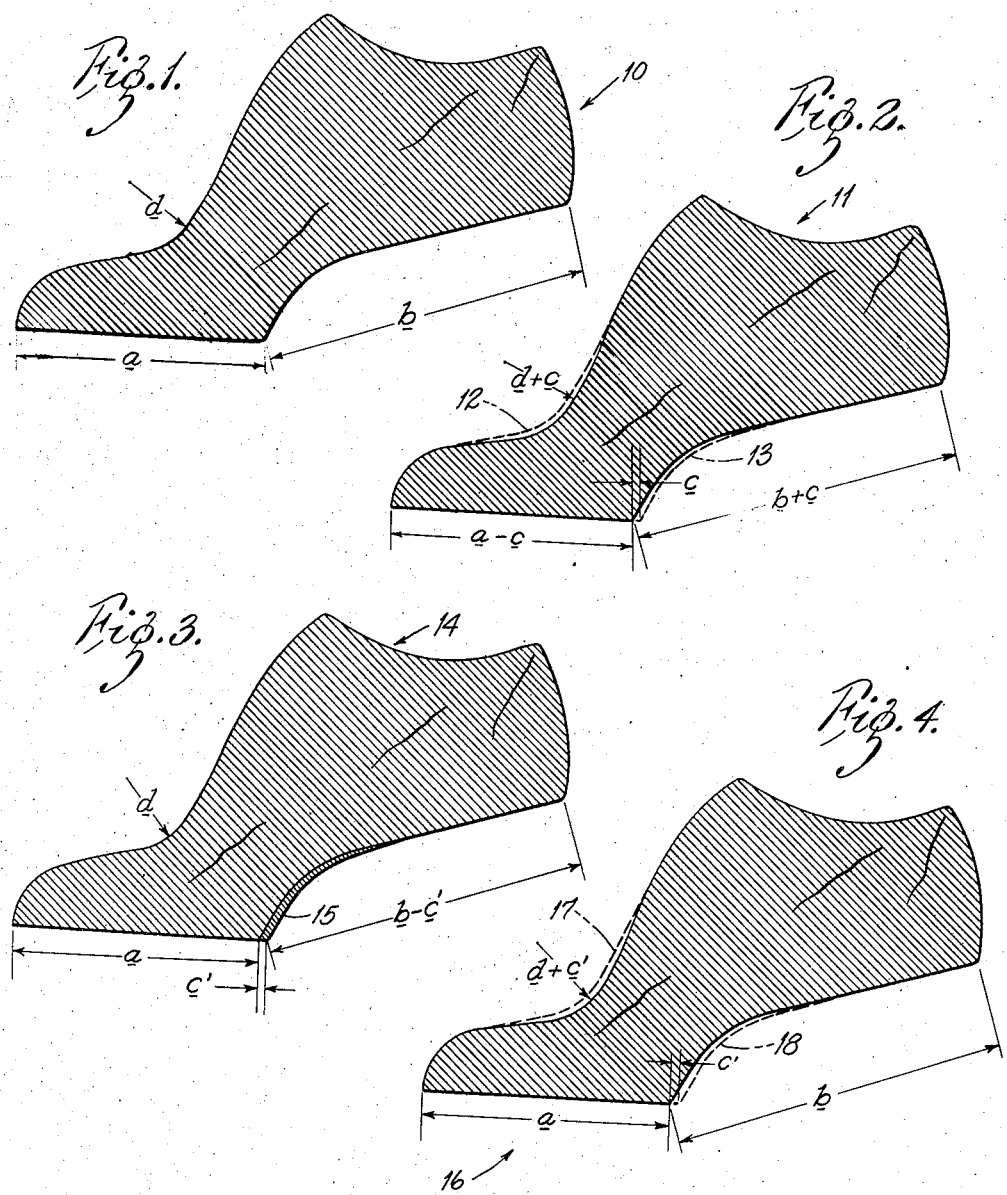

2,140,505

UNITED STATES PATENT OFFICE 2,140,505

METHOD OF MAKING LAST MODELS FOR SHOES

William M. Biddle, Collingswood, N. J.

Application May 10, 1937, Serial No. 141,592

5 Claims. (Cl. 144—309)

The present invention relates generally to shoe manufacturing, and more particularly to a method of constructing a master last model from which last models of lesser widths can be turned which have correct longitudinal bottom dimensions.

At the present time last models of graded widths are constructed from a master model of a standard width by the use of a last-turning machine. The master model and the last model blank are placed upon the last-turning machine which is adjusted relative to them; the machine is manipulated; and a last model is turned which is of a width a predetermined size less than the width of the master model. However, the last models resulting from this method of production are objectionably defective in that the distance between the point of the toe and the front edge of the shank portion decreases and the distance between the front of the shank portion and the rear of the heel seat increases for each last model of lesser width that is cut from one standard model. These aforesaid distances should remain constant for all widths of one size. Otherwise, the shanks of the last models will be too close to the throat portion. The fact that the machine upon which the work is performed must be rotated through 360° during its operation results in this cutting away of the shank portion of the last models.

Therefore, an object of the present invention is to provide a method of making a master last model from which last models can be constructed which have standard bottom dimensions.

Another object is to provide a master last model from which a last model of lesser width can be constructed through the use of a turning machine which will have standard bottom dimensions.

Another object is to provide a method of constructing last models having accurate dimensions.

Another object is to provide a method of constructing a master last model from which last models of lesser widths and of accurate proportions can be constructed.

Another object is to provide a method of making last models of accurate proportions including the use of a turning machine.

Another object is to provide an efficient, economical and simple method of constructing accurately proportioned last models.

Other objects and advantages will be apparent from the following description, taken in conjunction with the accompanying drawing in which:

Fig. 1 is a central longitudinal section through a conventional master model;

Fig. 2 is a central longitudinal section through a last model constructed by the use of a last-turning machine from the master model shown in Fig. 1;

Fig. 3 is a central longitudinal section through a master model constructed in accordance with the present invention; and Fig. 4 is a central longitudinal section through a last model constructed by the use of a turning machine from the master model shown in Fig. 3.

Referring to the drawing more particularly by reference numerals, 10 indicates generally a master last model conventionally used for constructing last models therefrom by the use of a last-turning machine. For illustrative purposes it is assumed that the master model 10 is size 4—B. The bottom dimensions of the master model 10 are indicated by the small letters $a$ and $b$, the former of which is the distance between the point of the toe and the forward point of the shank, and the latter of which is the distance between the forward point of the shank and the rearward point of the heel seat. The letter $d$ indicates the center of the vamp portion of the master model 10.

In Fig. 2 there is shown a last model 11 formed upon a turning machine from the master model 10. For illustrative purposes it is assumed that the last model 11 is size 4—A. The dotted lines 12 and 13 mark out the outline of the master model 10 and show in what respects the last model 11, size 4—A, is smaller than the master model 10, size 4—B. Inasmuch as the shank portion of the last model 11 has been cut down by the amount indicated $c$, the distance between the toe point and the forward point of the shank is $a$ minus $c$; whereas, the distance between the forward point of the shank portion and the rearward point of the heel seat is $b$ plus $c$. In other words, in producing by a turning machine a last model size 4—A from a master model size 4—B, the bottom dimensions of the last model are thrown out of proportion. The shank and the vamp portion of the last model 11 are, in effect, squeezed toward each other, which obviously is objectionable.

In Fig. 3 there is shown a master last model 14, size 4—B, constructed in accordance with the present invention. The shank portion is built up by the addition thereto of a layer 15 of suitable material which may be plastic wood, tape, or the like, so that the distance between the toe point and the forward point of the heel portion equals $a$ plus $c'$, where $c'$ is the amount by which the shank of a last model, size 4—A, would be shaved down in its construction upon a turning machine from the master last model 14 without the addition. The distance between the forward point of the shank portion and the rear point of the heel seat is then $b$ minus $c'$.

In Fig. 4 there is shown a last model 16, size 4—A, constructed on a turning machine from the master model 14. The dotted lines 17 and 18 indicate the full contours of the master model 14 and show in what respects the last model 16 is smaller relative to the master model 14. In producing the last model size 4—A from the master model size 4—B, the shank portion is cut away the amount $c'$. However, the amount $c'$ which is cut away is only the thickness of that portion 15 which was built up on the master model 14 and, therefore, the last model 16 has standard bottom dimensions $a$ and $b$.

It is apparent that there has been provided a method of constructing by the use of a turning machine from a master last model a last model which has standard bottom dimensions. It is further apparent that there has been provided a master last model from which last models of lesser widths having standard bottom dimensions may be constructed.

It is to be understood that the foregoing description and accompanying drawing have been given by way of illustration and example and not by way of limitation, the invention being limited only by the following claims.

What is claimed is:

1. The method of constructing a master last model for making models of lesser widths comprising building up the shank portion so that the longitudinal dimension of the bottom portion exceeds a standard length by an amount equal to that cut away on a last model of lesser width constructed from a conventional master model by the use of a last-turning machine.

2. The method of producing from a master last model of greater width a last model of lesser width comprising building up the shank of the master model to increase the length of the bottom line of the forepart of the last and to decrease the length of the bottom line of the rear part of the last, and constructing a last model from the built-up master model on a last-turning machine.

3. A method of constructing a master last model for preservation of the longitudinal bottom dimensions of a selected size in last models of a lesser width turned therefrom comprising building up the shank portion of a selected standard master last model to lengthen the longitudinal dimension of the front bottom portion an amount equal to the amount cut away on a last model of lesser width turned from such standard master last model in a normal turning operation.

4. A master last model from which last models of lesser width are adapted to be turned comprising a front bottom portion of a predetermined greater length than the length of the front bottom portion of a standard master last model of the same size, and a combined shank and heel portion of a predetermined lesser length than the length of the combined shank and heel portion of a standard master last model.

5. A master last model from which last models of lesser width are adapted to be turned comprising a built-up shank portion, the length of the front bottom portion thus being a predeterminate amount longer than a normal length and the combined length of the shank and heel portions being a predeterminate amount shorter than a normal length.

WILLIAM M. BIDDLE.